United States Patent [19]
Yahagi et al.

[11] 3,922,283
[45] Nov. 25, 1975

[54] NEW FLUORAN COMPOUND

[75] Inventors: Masakichi Yahagi, Tokyo; Shoichi Horiuchi, Fujimi, both of Japan

[73] Assignee: Shin Nisso Kako Co., Ltd., Tokyo, Japan

[22] Filed: Aug. 29, 1973

[21] Appl. No.: 392,545

[30] Foreign Application Priority Data
Sept. 4, 1972 Japan............................... 47-87914

[52] U.S. Cl. ................ 260/325; 117/36.2; 260/336
[51] Int. Cl.² ................ C07D 209/34; C07D 209/38
[58] Field of Search ............ 260/325, 336; 117/36.2

[56] References Cited
UNITED STATES PATENTS
3,446,817  5/1967  Harvey et al. ...................... 260/325

Primary Examiner—Elbert L. Roberts
Attorney, Agent, or Firm—Bierman & Bierman

[57] ABSTRACT

A compound of the general formula

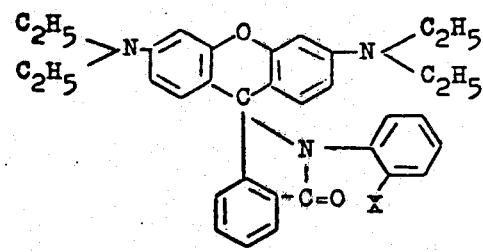

wherein X represents a halogen atom is disclosed together with a method of recording as well as a recording composition.

6 Claims, No Drawings

NEW FLUORAN COMPOUND

This invention relates to a method of recording, which method is characterized by intimately contacting a rhodamine lactam derivative represented by the general formula

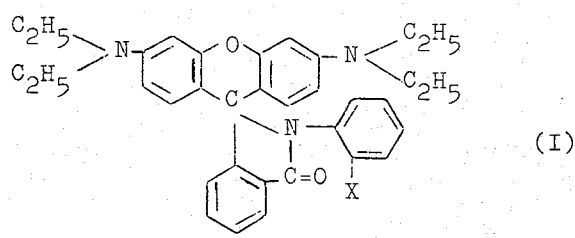

wherein X represents a halogen atom, with an electron accepting material, thereby permitting said rhodamine lactam derivative to develop color.

Rhodamine lactam derivatives represented by the general formula (I) mentioned above are substances which are substantially colorless in themselves, but have such property that they develop a deep purplish pink color or pinkish purple color when brought intimately into contact with such electron accepting materials, for example, as acids, clays, phenolformalin resin, bis-phenol A and the like. Accordingly, by utilizing the property mentioned above, the rhodamine lactam derivatives represented by the general formula (I) may be advantageously utilized as chromogenic materials for use in the preparation of so-called pressure sensitive copying sheets, pressure sensitive recording sheets, thermo sensitive copying sheets, thermo sensitive recording sheets and the like. That is, color is developed by bringing a rhodamine lactam derivative of the general formula (I) in the form of its solution in an inert organic solvent into contact with a clay or phenol-formalin resin. Further, color is also developed even when finely divided particles of the said rhodamine lactam derivative are placed under pressure closely in contact with finely divided particles of a clay or phenol-formalin resin, or by bringing intimately a mixture thereof into contact while heating the mixture at least a temperature above a melting point of one of the two components. Furthermore, when finely divided particles of the two are brought intimately into contact in an electrostatic manner, color is also developed.

Accordingly, a pressure sensitive copying sheet may be prepared by assembling into a unit a sheet of paper coated on its rear surface with microcapsules containing therein solutions of a rhodamine lactam derivative of the aforesaid general formula (I) in an inert organic solvent and a sheet of paper coated on its surface with a clay or phenol-formalin resin. Furthermore, there may be used as a pressure sensitive recording sheet a sheet of paper coated on its surface with the said microcapsules in admixture, for example, with such electron accepting material as a clay or phenol-formalin resin.

A sheet of paper coated on its surface with a mixture comprising finely divided particles of a rhodamine lactam derivative of the general formula (I), finely divided particles of such electron accepting material, for example, as a clay, phenol-formalin resin or bis-phenol A and an appropriate amount of such binder, for example, as polyvinyl alcohol may be used as thermo sensitive recording sheet, because color is developed on the surface by means of a heated pen or heated type. This sheet may also be used for copying purpose, because the color development due to an intimate contact of the rhodamine lactam derivative with the electron accepting material takes place when a thin sheet of paper having an original written on its surface with a material liable to absorb infrared ray (e.g. Chinese ink, black ink or the like) and being placed closely in contact with the surface of the coated sheet is irradiated with a strong infrared ray. This sheet may also be printed by applying a local pressure strongly to the surface thereof. Further, when words or figures are printed or written on the surface of a sheet of paper coated with finely divided particles of such electron accepting material as a clay or phenol-formalin resin by use of an organic solvent solution or ink-like material (these are essentially colorless) containing a rhodamine lactam derivative of the general formula (I), the words or figures thus printed or written are recorded on the surface of the sheet.

Further, by use of a typewriter ribon prepared by impregnation with the said organic solvent solution or ink-like material, a sheet of paper coated on its surface with an electron accepting material may be printed with a typewriter. Furthermore, words or figures may be written on the surface of a sheet of paper coated with an electron accepting material by means of a solid stick-like kneaded product prepared by mixing the said organic solvent solution or inklike material with paraffins and/or waxes. Needless to say, usable as supports for the aforesaid microcapsules, electron accepting materials and the like in the above-mentioned recording sheets, are high molecular weight materials in the form of film, fabrics, non-woven fabrics and the like materials, including of course papers.

Colors developed by contact of the rhodamine lactam derivatives of the general formula (I) with an electron accepting material are from purplish pink to pinkish purple. It is also possible, however, to give variety of hue of the rhodamine lactam derivative by mixing it with other chromogenic material producing a color in different hue, or to give variety of hue of a chromogenic material developing a color in different hue by mixing it with the rhodamine lactam derivative. It is also possible to further improve in fastness to light of the rhodamine lactam derivatives by mixing them, for example, with a ultraviolet absorber or the like. In the case where color development of the present rhodamine lactam derivative takes place, a long period of time is required before the developed color is saturated as compared with the case of fluoran derivatives which are also used as chromogenic materials. That is, color is developed immediately after contact of the present rhodamine lactam derivative with, for example, an acid clay, though the color thus developed is not so deep, but the color gradually becomes deep with the lapse of time. Moreover, the color thus developed is rich in fastness to light as compared with colors developed by use of common fluoran derivatives. It is possible, therefore, to obtain a chromogenic material (mixture) which is excellent in instantaneous color development and which has fastness to light by mixing a fluoran derivative which produces a color in reddish tint with a rhodamine lactam derivative of the general formula (I). It is also possible to prepare a chromogenic material (mixture) which produces a color capable of maintaining itself in black even when exposed to light for a long period of time by mixing, for example, a chromogenic material which produces a color being nearly black just after it is developed but liable to change therefrom to green by the action of light with an appropriate amount of a rhodamine lactam derivative of the general formula (I).

Preparation of a pressure sensitive sheet by use of a rhodamine lactam derivative of the aforesaid general formula (I) may be carried out, for example, according to a procedure disclosed in U.S. Pat. Nos. 2,548,366, 2,800,458 and 2,969,370 specifications, respectively. Furthermore, for application to a heat sensitive recording material such as a heat sensitive recording sheet or a heat sensitive copying sheet of the said rhodamine lactam derivative, such a procedure, for example, as described in Japanese Patent Publication Nos. 6040/65, 4160/68 and 14039/70, respectively, may be adopted.

It has been heretofore known that a rhodamine lactam derivative (2-[3,6-bis(diethylamino)-9-anilinoxanthyl]benzoic acid lactam) represented by the formula

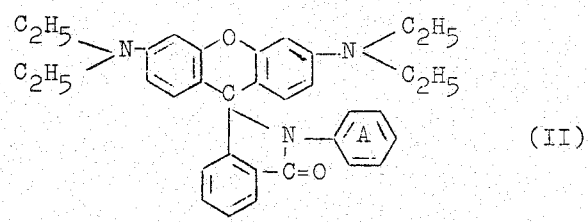

(II)

wherein a benzene ring A does not have any substituent other than hydrogen atom, may be used as a chromogenic material for pressure sensitive copying sheet, the contact of said derivative with a clay resulting in a pink coloration. The present inventors have found that by virtue of introducing a halogen atom into the ortho position of the benzene ring A of the compound of the above-mentioned formula (II), the color developed by contact of the resulting compound with a clay becomes deep and is improved in its fastness to light and, further, is increased in solubility in an organic solvent used in the preparation of pressure sensitive copying sheet. It is a quite notable fact that the compound obtained by introducing a halogen atom into the benzene ring A in the manner mentioned above is improved in such efficiencies as referred to above. As a matter of fact, in case a halogen atom is introduced into a para position of the benzene ring A or a methyl group is introduced into an ortho position of said ring A, each of the resulting compounds is found inferior in its efficiencies to the above-mentioned known rhodamine lactam not having any of such substituents. From the standpoint of effectiveness, rhodamine lactam derivatives in relation to their respective substituents in the benzene ring A in the aforesaid formula (II) are shown on Table 1. Table 1 shows the values of the compounds measured in the following manner. 0.1 Gram each of four kinds of rhodamine lactam derivatives shown in Table 1 was dissolved at 80°–100°C. in 5.0 g of dichlorodiphenyl and the resulting solution was diluted with 125 g of triclene to prepare a solution. Into the solution was immersed for 15 seconds an underneath sheet coated on its surface with an activated clay for use in a pressure sensitive copying sheet, and the underneath sheet was then taken out of the solution, held between filter papers and dried. After the lapse of about 3 hours, the dried underneath sheet was tested with a colordifference meter to obtain a value. The respective values of the four compounds thus obtained were as shown in Table 1. Each of the underneath sheets treated in the manner mentioned above was exposed to light for a period of time shown in Table 1 by use of a xenone arc type fademeter and then tested with a color-difference meter to obtain a value. The respective values of the four compounds thus measured were as shown in Table 1.

Table 1

| A | Melting point (°C) | | Exposure time (hr) | | | | |
|---|---|---|---|---|---|---|---|
| | | | 0 | 1 | 5 | 10 | 20 |
| phenyl | 222 | L | 42.58 | 42.88 | 46.88 | 52.38 | 58.80 |
| | | a | +60.90 | +59.38 | +47.98 | +41.08 | +28.23 |
| | | b | −45.80 | −38.20 | −24.70 | −15.42 | − 4.40 |
| | | Color diff. | 0 | 7.76 | 25.11 | 37.57 | 55.18 |
| Cl-phenyl | 204.8 ~ 206.8 | L | 39.01 | 39.81 | 43.70 | 49.42 | 53.73 |
| | | a | +62.13 | +60.00 | +50.49 | +43.80 | +36.12 |

Table 1-continued

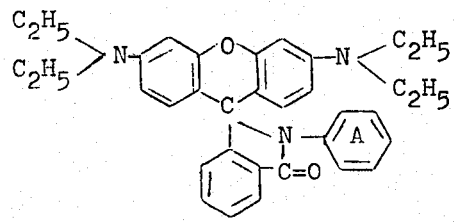

| ⟨A⟩ | Melting point (°C) | | Exposure time (hr) | | | | |
|---|---|---|---|---|---|---|---|
| | | | 0 | 1 | 5 | 10 | 20 |
| | | b | −49.45 | −43.20 | −28.59 | −18.88 | −10.03 |
| | | Color diff. | 0 | 6.64 | 24.69 | 37.11 | 49.44 |
| —⟨ ⟩—Cl | 186.0 ∼ 188.8 | L | 41.48 | 42.27 | 46.97 | 56.32 | 65.12 |
| | | a | +63.62 | +61.40 | +49.82 | +36.72 | +20.22 |
| | | b | −47.62 | −39.42 | −22.90 | −11.95 | + 0.18 |
| | | Color diff. | 0 | 8.53 | 28.84 | 47.08 | 68.76 |
| —⟨ ⟩— / CH₃ | 177.8 ∼ 179.6 | L | 46.02 | 45.42 | 49.30 | 56.20 | 62.68 |
| | | a | +54.70 | +56.98 | +46.67 | +37.42 | +24.82 |
| | | b | −43.40 | −39.05 | −22.22 | −11.82 | − 0.93 |
| | | Color diff. | 0 | 4.95 | 22.89 | 37.41 | 54.54 |

In the above table, L represents brightness, and the larger the value of L, the more brighter the color, and +a represents redishness and −b represents bluishness. These values show that the larger are the absolute values thereof, the deeper are their respective hues. Color difference between two colors is determined according to $\sqrt{(a_1-a_2)^2+(b_1-b_2)^2+(L_1-L_2)^2}$, when L, a and b of the two colors are taken as $L_1$, $a_1$ and $b_2$, and $L_2$, $a_2$ and $b_2$, respectively. In the above table, the color before exposure to light was taken as a standard, and the difference between the standard color and the color after the exposure was calculated. That is, as shown in Table 1, the compound having a chlorine atom at the orth position of the benzene ring A is deep in hue before as well as even after the exposure and no fading owing to the exposure is observed.

The rhodamine lactam derivative of the general formula (I) is obtained by heating Rhodamine B of the following formula

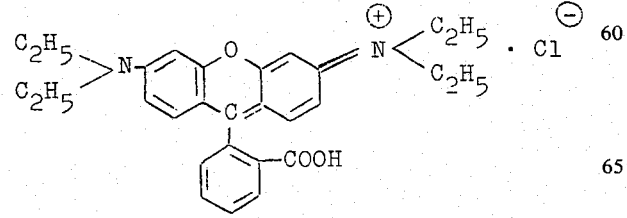

together with o-halogenoaniline in an inert organic solvent, e.g. toluene or xylene, preferably in the presence of phosphorus oxychloride.

Given below are a preparative example of a chromogenic material used in the method of recording in accordance with the present invention and examples of the present invention, but it should be construed that the invention is not limited thereto.

PREPARATIVE EXAMPLE 1

To a mixture of 102 g of Rhodamine B, 408 g of toluene and 204 g of o-chloroaniline was added dropwise 60.7 g of phosphorus oxychloride, whereby heat is gradually generated and the temperature reached 100°C. which was then maintained for one hour. After completion of the reaction, the residual toluene and o-chloroaniline was distilled off by steam distillation and a crude product was allowed to deposit. The crude product was extracted with 1000 ml of toluene, washed several times with dilute alkali water and then the greater part of the toluene was distilled off. In the residue was poured 300 ml of methanol, whereby 100 g of 2-[3,6-bis-diethylamino-9-(o-chloroanilino)-xanthyl]-benzoic acid lactam of the formula

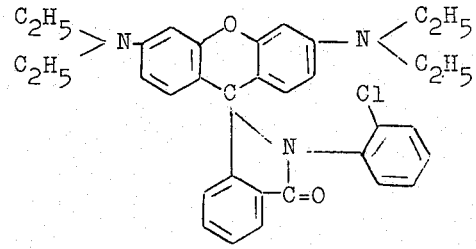

was obtained as white crystal, m.p. 205°–207°C.

EXAMPLE 1

1.0 Gram of 2-[3,6-bis(diethylamino)-9-(o-chloroanilino)xanthyl]benzoic lactam of the formula

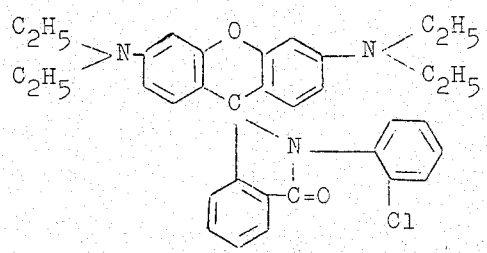

is dissolved at 80°C. in 20 g of alkyl naphthalene to prepare a liquid A. On the other hand, 20 g of gelatine(isoelectric point: 8.0) and 0.5 g of C.M.C are dissolved in 120 ml of water to prepare a liquid B. Subsequently, the liquid A is mixed with the liquid B at 50°–60°C. and the mixture is emulsified by high speed stirring.

The resulting emulsion is adjusted to pH 8.5–9.0. After the adjustment of pH, the emulsion is stirred at high speed for 20 minutes and then the pH of the emulsion is gradually lowered to 4.2–4.4 by addition of dilute hydrochloric acid or dilute acetic acid. Thereafter the emulsion is cooled to 5°–10°C. while continuing the stirring and charged with 6 g of formaline (37%), and the stirring is continued at 10°–20°C. for an additional one hour. Subsequently, the emulsion is adjusted to pH 9.0 by use of a sodium hydroxide solution (5%). The emulsion is further stirred slowly for several hours, whereby an emulsion containing microcapsules (containing therein an alkyl naphthalene solution of the aforesaid rhodamine lactam derivative) covered with a sufficiently gelled film composed of C.M.C and gelatine is obtained. A sheet of paper is coated with the emulsion thus obtained and then dried. The coated surface of the sheet is placed on the surface of another sheet of paper coated with a phenol-formalin resin. When words are written on the surface of the top sheet, the words written are developed in pale pinkish purple color. The words thus developed changed with the lapse of time to deep purplish pink color. Furthermore, no coloration took place at all on the surface of sheet coated with the aforesaid capsulecontaining emulsion even when said surface was exposed to sun light.

EXAMPLE 2

6.0 Grams of 2-[3,6-bis(diethylamino)-9-(o-chloroanilino)xanthyl] benzoic acid lactam and 30.0 g of 3-diethyl-6-methyl-7-(p-n-butylanilino) fluoran (a chromogenic material which develops color in blackish green) are mixed together and pulverized for 1 hour together with 150 g of a 10% aqueous polyvinyl alcohol solution (the polyvinyl alcohol used is a 98% hydrolyzate) and 65 g of water to prepare a dispersion. Particle diameter of the chromogenic materials after pulverization was 1–3 microns (component A).

On the other hand, 35 g of 4,4′-isopropylidene diphenol (bisphenol A), 150 g of a 10% aqueous polyvinyl alcohol solution and 65 g of water are mixed together and pulverized for 1 hour.

Particle diameter of the bisphenol A after pulverization was 1–3 microns (component B).

Subsequently, 3 g of the component A and 67 g of the component B are mixed together, and the mixture is coated on the surface of a sheet of paper and then dried to obtain a heat sensitive recording sheet. Black color is very quickly developed on the surface of the sheet by application of heat by means of a heated needle, heated type or heated pattern, and the black color thus developed was found to be fast to sun light. Furthermore, no spontaneous coloration of the coated surface of the sheet was observed even after the lapse of a long period of time.

Further, a thin sheet of paper having a manuscript written on its surface with a black pencil, blackink, Chinese ink or other coloring matters liable to absorb infrared ray, was placed on the coated surface of the aforesaid recording sheet, and the resulting unit was passed through Risofax BF–11 (an infrared heat sensitive copying machine manufactured by Riso Kagaku Kogyo Sha), whereupon portions corresponding to the words or images of the manuscript were reproduced quickly in black color on the coated surface of the recording sheet.

EXAMPLE 3

1.0 Gram of 2-[3,6-bis(diethylamino)-9-(o-chloroanilino)xanthyl]benzoic acid lactam, 0.5 g of Crystal Violet Lactone and 0.5 g of Benzoyl Leuco Methylene Blue are dissolved in 20 g of alkyl diphenyl methane while heating at 80°C. The resulting solution is mixed with the liquid B of Example 1. The mixture is treated in the same procedure as in Example 1 to prepare an emulsion which is then coated on the surface of a sheet of paper and then dried. The coated surface of the sheet is placed on the surface of another sheet of paper, which surface has been coated with a clay and then dried. When words are written on the surface of the upper sheet, the words thus written are developed in blue color on the clay-coated surface. A sheet of paper coated on its surface with a mixture of Crystal Violet Lactone and Benzoyl Leuco Methylene Blue without using the aforesaid rhodamine lactam develops likewise blue color on the clay-coated surface of another sheet of paper. However, when the two sheets prepared above are exposed to light, the blue color of the latter changes very quickly to green color.

EXAMPLE 4

A solution comprising 1.5 g of 2-[3,6-bis(diethylamino)-9-(o-chloroanilino)xanthyl]benzoic acid lactam, 5 g of diethyl phthalate, 10 g of castor oil and 5 g of chlorinated paraffin is prepared. A rubber stam or a wooden plate for printing is immersed in the solution. Separately, a sheet of paper is coated on its surface with an activated clay and then dried. When the said rubber stamp or wooden plate was brought into contact with the clay-coated surface of the sheet, the words of said rubber stamp or wooden plate were reproduced very quickly in pink color on said clay-coated surface.

What we claim is:

1. A compound of the general formula

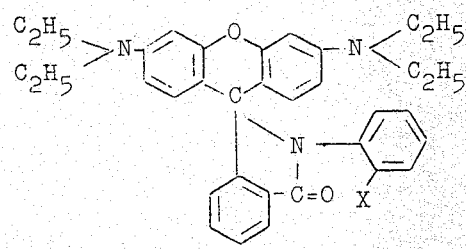

wherein X represents a halogen atom.

2. A compound of the formula

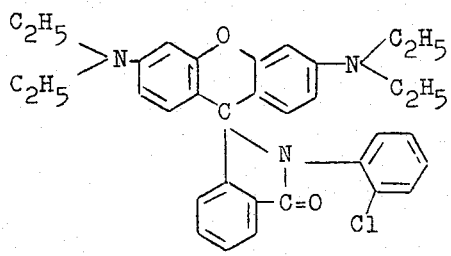

3. A thermo sensitive recording material which comprises, as color-forming ingredient, a compound of the general formula

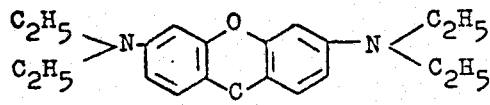

wherein X represents a halogen atom and an electron accepting substance.

4. A material according to claim 3 wherein said substance is taken from the class consisting of acids, clays, phenol-formalin resin and bis-phenol A.

5. A recording material which comprises the compound of claim 1 and an inert organic solvent.

6. A material according to claim 5 which is microencapsulated.